(12) United States Patent
Ng et al.

(10) Patent No.: US 7,409,526 B1
(45) Date of Patent: Aug. 5, 2008

(54) PARTIAL KEY HASHING MEMORY

(75) Inventors: Daniel Yu-Kwong Ng, Los Altos, CA (US); Yung-Chin Chen, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 240 days.

(21) Appl. No.: 10/696,467

(22) Filed: Oct. 28, 2003

(51) Int. Cl.
G06F 12/00 (2006.01)
(52) U.S. Cl. ...................................... 711/216
(58) Field of Classification Search ............... None
See application file for complete search history.

(56) References Cited

U.S. PATENT DOCUMENTS

| | | | |
|---|---|---|---|
| 6,345,347 B1* | 2/2002 | Biran | 711/163 |
| 6,430,670 B1* | 8/2002 | Bryg et al. | 711/216 |
| 6,493,813 B1* | 12/2002 | Brandin et al. | 711/216 |
| 6,594,665 B1* | 7/2003 | Sowa et al. | 707/10 |
| 2002/0016806 A1* | 2/2002 | Rajski et al. | 708/252 |
| 2002/0152389 A1* | 10/2002 | Horita et al. | 713/180 |
| 2005/0086363 A1* | 4/2005 | Ji | 709/235 |

* cited by examiner

*Primary Examiner*—Hyung Sough
*Assistant Examiner*—Craig E Walter
(74) *Attorney, Agent, or Firm*—Stolowitz Ford Cowger LLP

(57) ABSTRACT

A method and apparatus wherein only a partial key is stored in a hashing table is disclosed. By storing a partial key as opposed to storing the entire original key, less data is required to be stored in the hash table. This reduces the attendant memory costs. The reduction in memory requirement does not degrade the hash functionalities whatsoever. Hashing conflicts can be fully resolved by consulting the partial key.

32 Claims, 10 Drawing Sheets

PARTIAL KEY HASHING MEMORY

FIELD OF THE INVENTION

The present invention relates to an efficient hash storage scheme. More particularly, the present invention pertains to a hashing memory wherein only the partial keys are stored for resolving hash conflicts.

BACKGROUND OF THE INVENTION

Businesses and individuals rely upon networks (e.g., the Internet) for communications and the exchange of data. Computers coupled to these networks allow users to readily gain access to and exchange data of all types (e.g., sound, text, numerical data, video, graphics, multi-media, etc.) with other computers, databases, websites, etc. This enables users to send and receive electronic mail (e-mail) messages, browse web sites, download files, participate in live discussions in chat rooms, play games in real-time, watch streaming video, listen to music, shop and trade on-line, etc. With increased network bandwidth, video-on-demand, HDTV, IP telephony, video teleconferencing, and other types of bandwidth intensive applications will become prevalent. But in each of these applications, the underlying technology is basically the same. The data is first broken up into several smaller "packets." The data packets are then individually routed through one or more networks via a number of interconnected network devices. The network devices, such as routers, hubs, and/or switches, direct the flow of these data packets through the network to their intended destinations.

To illustrate this process, FIG. 1 shows a simplified diagram of three computers 101-103 coupled to a network 104. Any of the three computers can transmit and/or receive data over network 104 to any of the other computers coupled to that network. In order to properly route these packets, each packet contains a destination address. The destination address specifies the proper destination for that particular packet. When a packet is received by a network device, the packet's destination address is examined by the network device. Based on the destination address, the network device knows how to properly forward that particular packet. Eventually, the packet will work its way through the network to its intended destination as it is forwarded through one or more network devices.

The manner by which a network device determines how a packet is to be forwarded is shown in FIG. 2 which depicts a generic network device. Network device 201 has a number of input ports 01-04 for accepting packets from numerous sources. The incoming packets are processed by a forwarding engine 202. Forwarding engine 202 determines the destination address embedded in the packet and uses this destination address to access information stored in memory 203. The information contained in memory 203 specifies which of the output ports 01-04 that particular packet is to be routed.

One type of memory commonly used in network devices is referred to as content-addressable memory (CAM). FIG. 3 shows a typical CAM. CAMs are typically fashioned from custom designed application specific integrated circuits (ASICs). CAMs have an advantage in that they have 100 percent utilization. This means that there is no conflict issue between two different keys. Unfortunately, CAMs are very expensive to manufacture. Furthermore, CAMs are relatively small. The biggest configuration today is around 256 k×72 bits. In addition, CAMs are relatively slow; they run approximately at 200 MHz versus fast DRAMs today run at 400 MHz. Yet another drawback to CAMs is there inherently high power consumption.

Another type of memory which can be used is random access memory (RAM). RAM memory is cheaper than CAMs. With advances made in RAM fabrication techniques, they are becoming faster and cheaper. Consequently, RAM memory is becoming an increasingly attractive alternative to CAM memory amongst network device designers. Although RAM memory is relatively inexpensive, the amount of data that needs to be stored for ready reference is quite extensive. Consequently, the associated memory costs can still be quite costly. One way to reduce the amount of data to be stored involves using a technique called, "hashing." Hashing is a scheme which provides rapid access to data which is distinguished by a key. Each data item to be stored is associated with a key. A hash function is applied to the key, and the resulting hash value is used as an index to select one of a number of results in a hash table. If, when adding a new item, the hash table already has an entry at that indicated location, then that entry's key must be compared with the given key to see if it is the same. If the two items' keys hash to the same value, a hash "collision" has occurred, and some alternative location is used.

FIG. 4 shows an exemplary hashing scheme. Hash table 401 requires a hash function 402 that takes an input (key) and transforms it to a fixed-size hash value. Next, the hash value is used to access the hash table 401. In the example shown, an input key "A" is 32 bits wide. It is transformed via hash function 402, typically a pre-determined polynomial function. The output from the hash function 402 is a shortened 20 bits. This 20 bit hash value is used as a pointer to access hash table 401. The result in hash table 401 corresponding to that key is then output to the forwarding engine to direct the packet to its proper output port. Unfortunately, there may be instances where two inputs hash to the same key. Due to these potential hash conflicts, whereby multiple inputs generate the same hash value, the original key must be stored in the hash table. In this manner, the stored original key can be compared to the input to ensure a true match. For instance, there are as many as $2^{12}$ or 4096 32-bit keys which could hash to the same key. To resolve any conflicts between "A" and "B", the original "A" key is stored in hash table 401. Thereby, a simple comparison will resolve the conflict.

Applying hashing techniques to RAM memory has been very powerful and efficient. However, it would be even better, more efficient, and less expensive if one could somehow store even less data in the hash tables without reducing its efficacy. The present invention provides one such novel, unique solution. The present invention enables one to store less data in the hash table(s) without degrading any functionality whatsoever.

SUMMARY OF THE INVENTION

The present invention pertains to a method and apparatus wherein only a partial key is stored in relation to hashing. By storing a partial key as opposed to storing the entire original key, less data is required to be stored in the hash table. This reduces the attendant memory costs. The reduction in memory requirement does not degrade the hash functionalities. Hashing conflicts can be fully resolved by consulting the partial key.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

An extremely efficient way for storing data in a hash table is disclosed. Specifically, with the present invention, less data is required to be stored in a hash table, thereby saving costs. And in spite of less data being stored, no functionality is lost. In the following description, for purposes of explanation, numerous specific details are set forth in order to provide a thorough understanding of the present invention. It will be known, however, to one skilled in the art that the present invention may be practiced without these specific details. In other instances, well-known structures and devices are shown in block diagram form in order to avoid obscuring the present invention.

Figure 1:
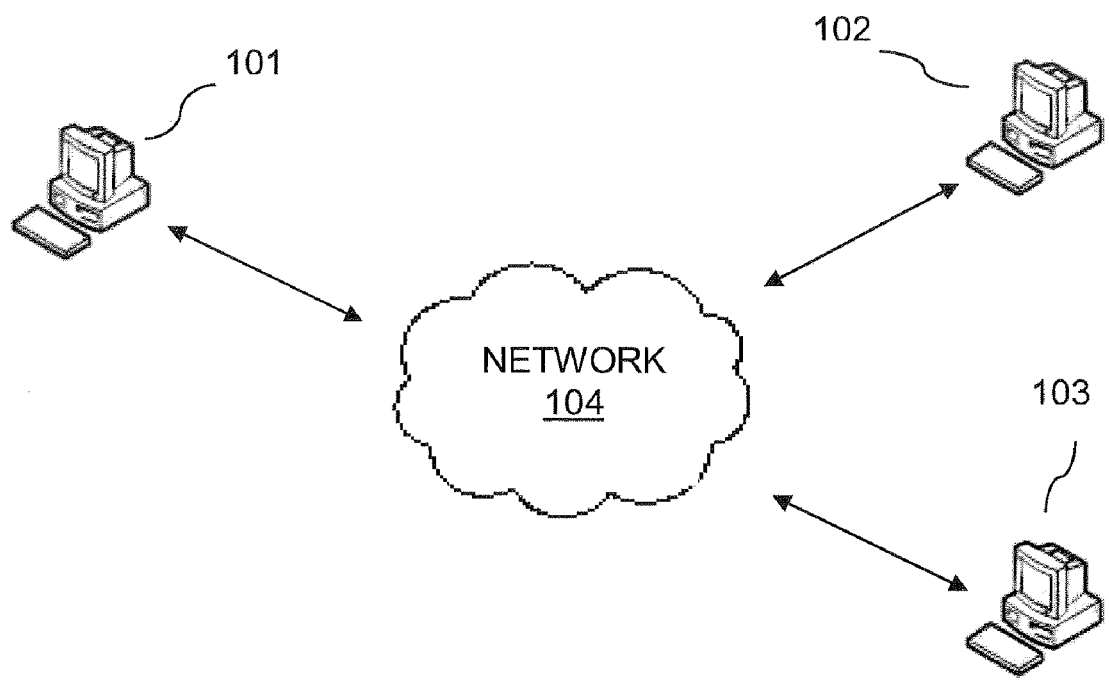
FIG. 1 shows a simplified diagram of three computers coupled to a network.
Figure 2:
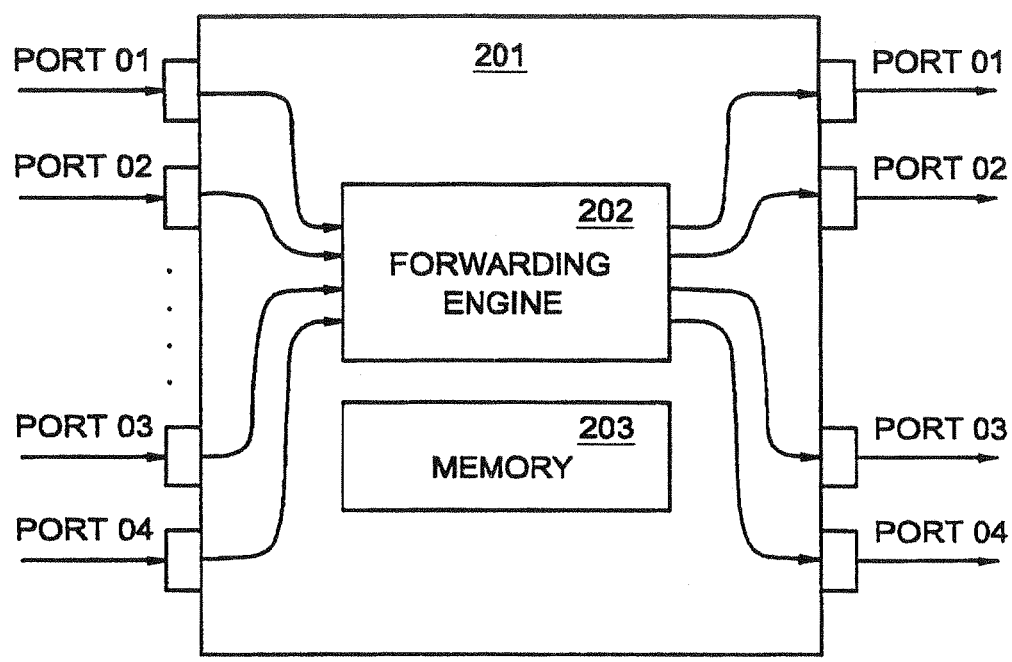
FIG. 2 depicts a generic network device for accepting incoming packets and forwarding those packets to their appropriate destinations.
Figure 3:
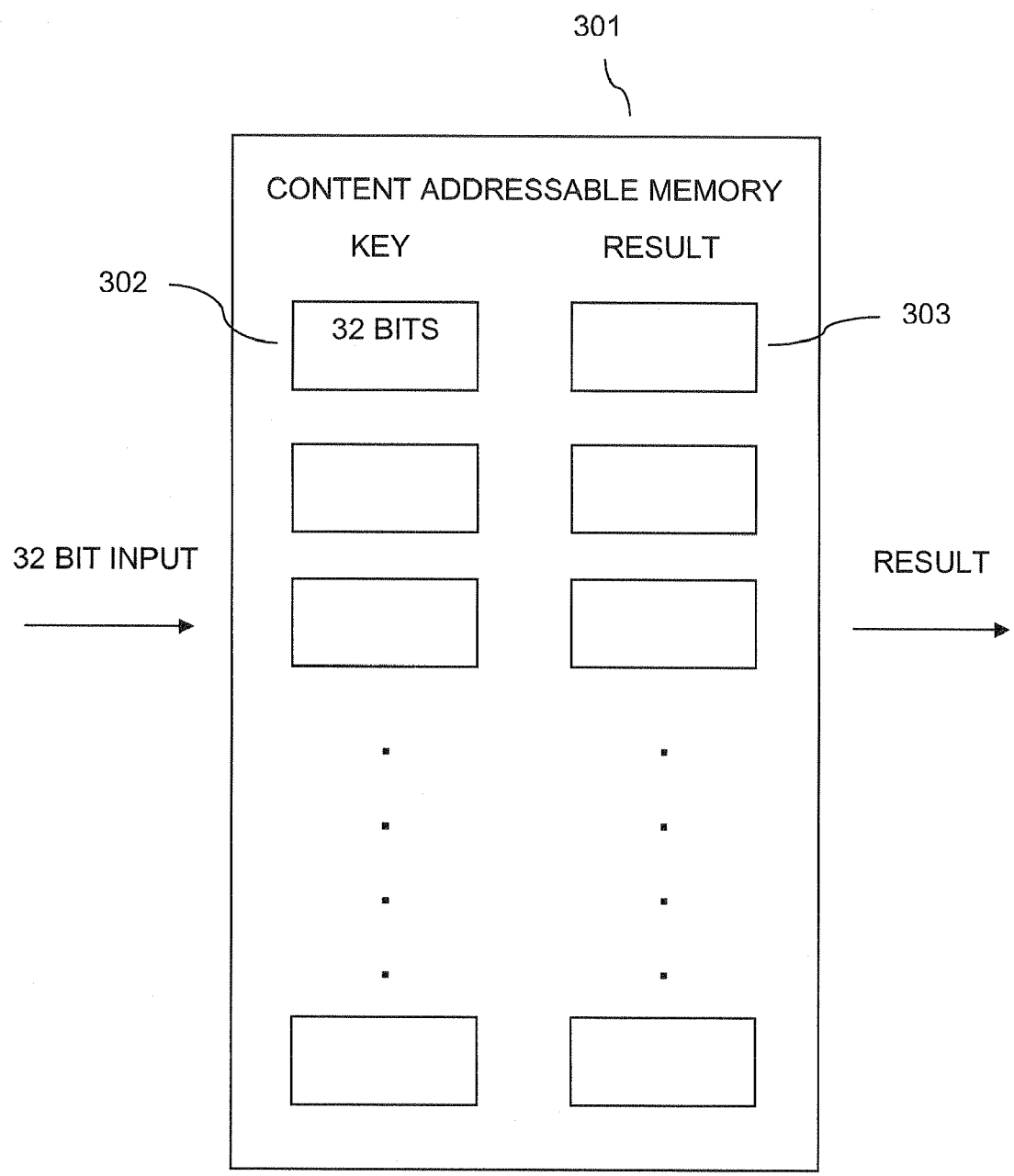
FIG. 3 shows a typical content addressable memory (CAM).
Figure 4:
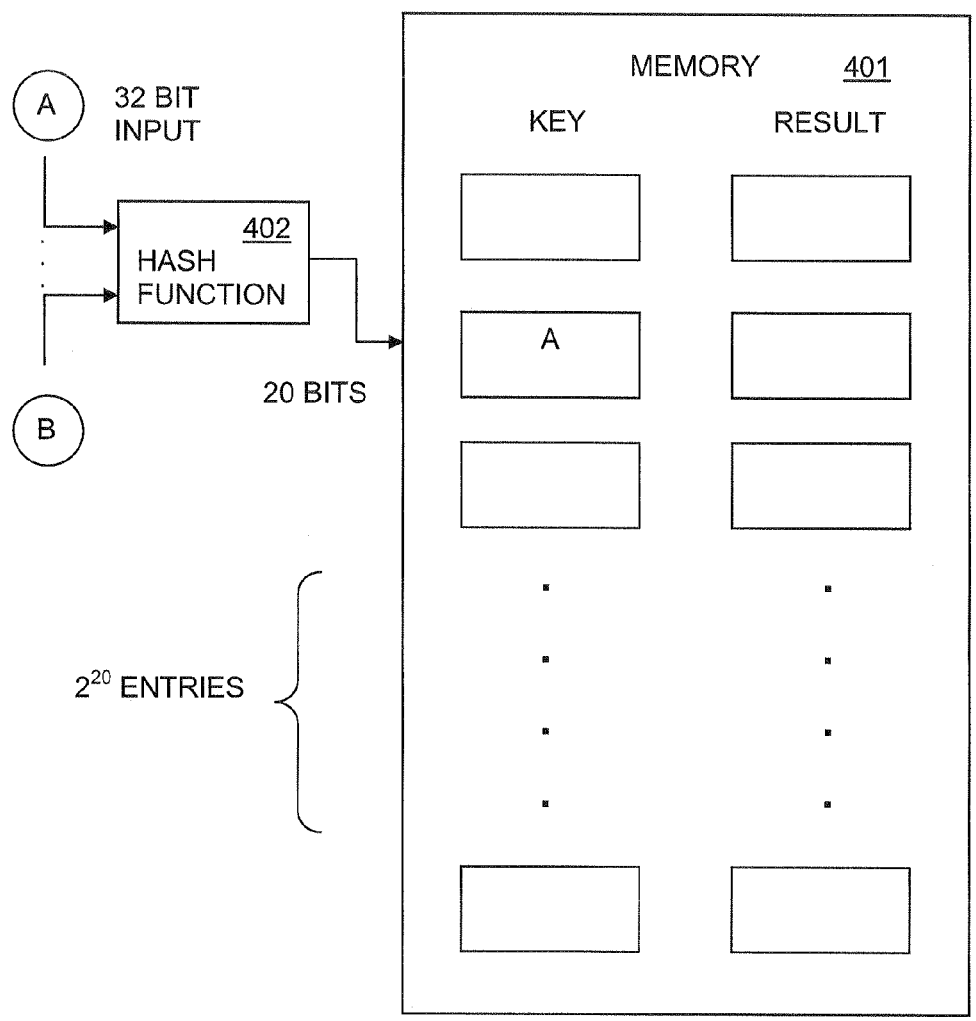
FIG. 4 shows an exemplary hashing scheme.
Figure 5:
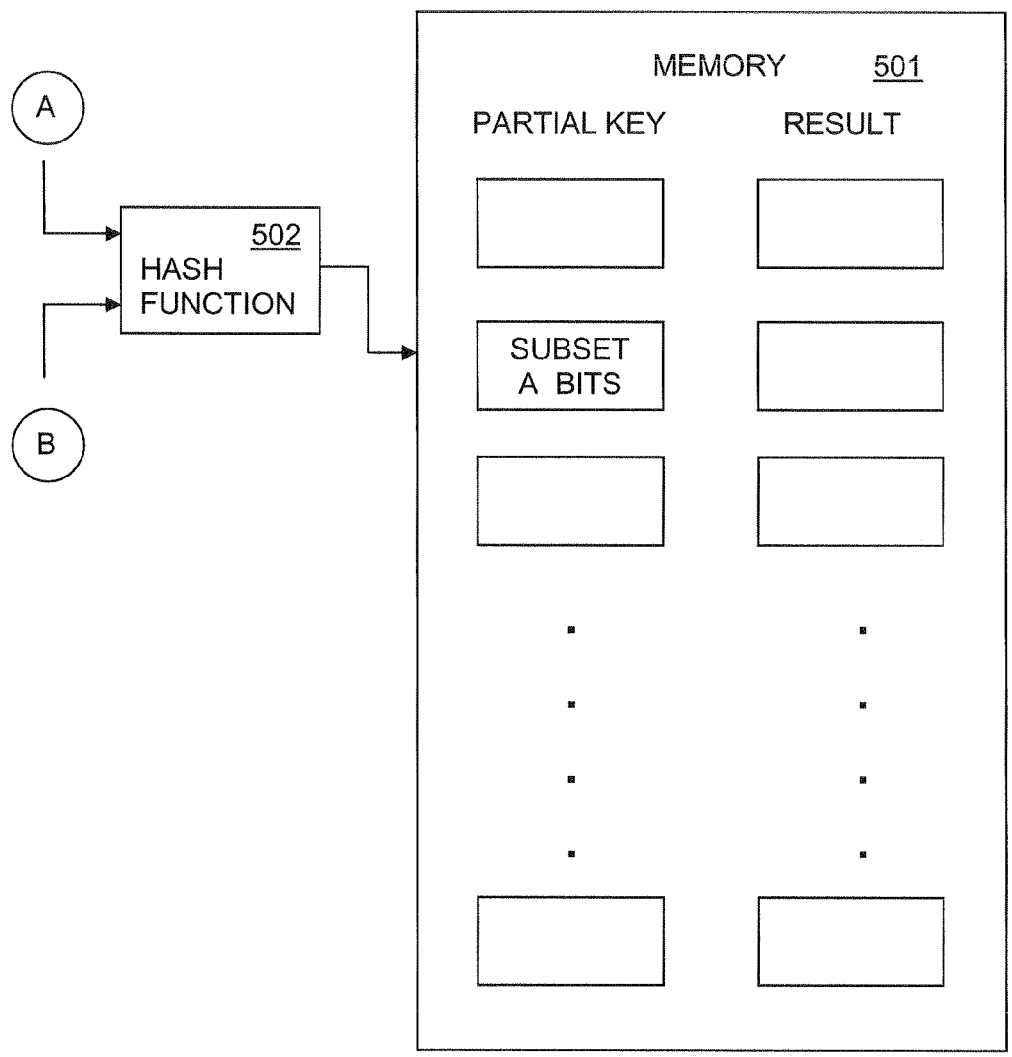
FIG. 5 shows a block diagram illustrating the present invention.

FIG. 5 shows a block diagram illustrating the present invention. A usual input key is transformed by a hash function 502. The hash value is then used to access the hash table 501 to find the corresponding result. However, rather than storing the entire original key, only a subset of the bits from the original key is stored in hash table 501. By storing only a subset of bits from the original key, less memory is required per entry. Given that hash tables can contain upwards of millions of entries, the savings in bits per entry can add up to be quite significant. For example, applying the present invention to one particular embodiment given an original table of 16-way×8 k×115 bits; the degree of the polynomial is 13; the memory saved is 1.7 Mb or 11% of the on-chip memory. It should be noted that the present invention is applicable to any polynomial as well as any degree of polynomial.

Figure 6A:
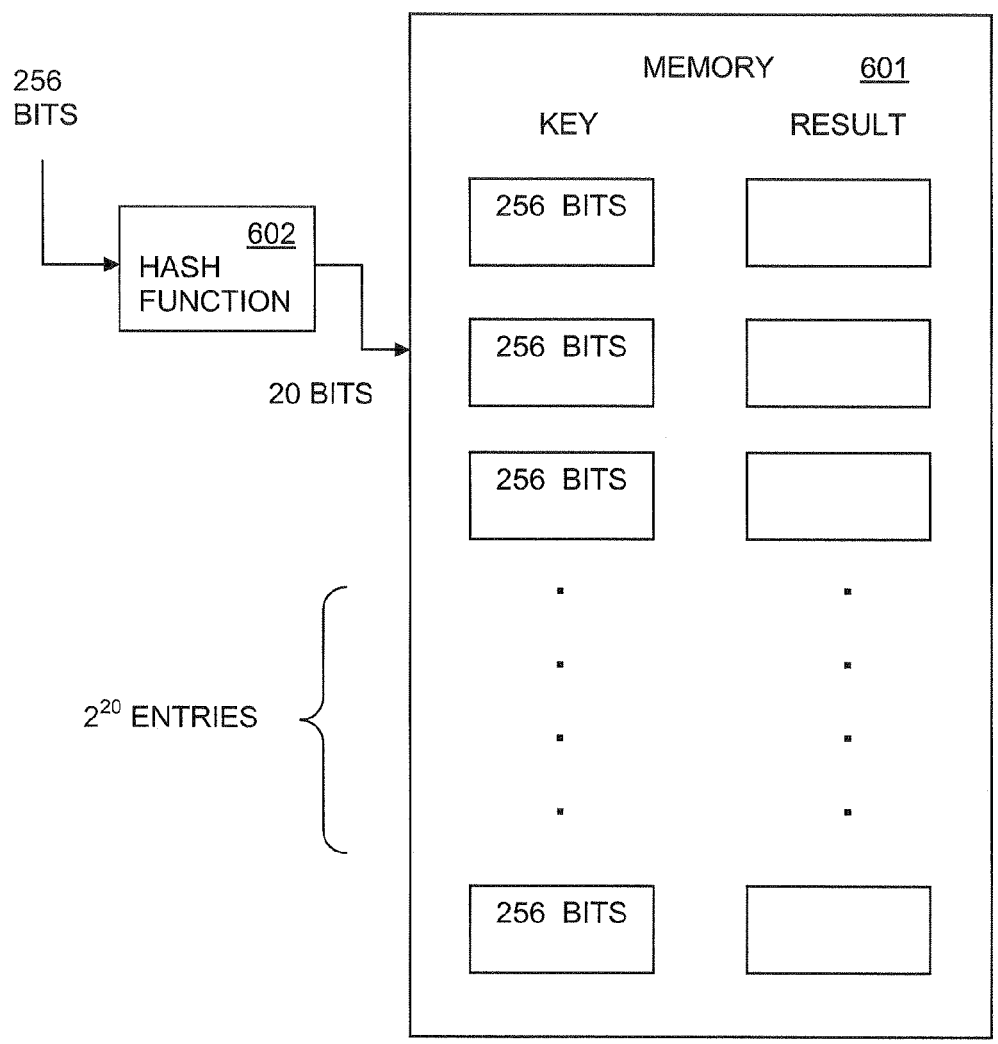
FIG. 6A shows a typical method used today.
Figure 6B:
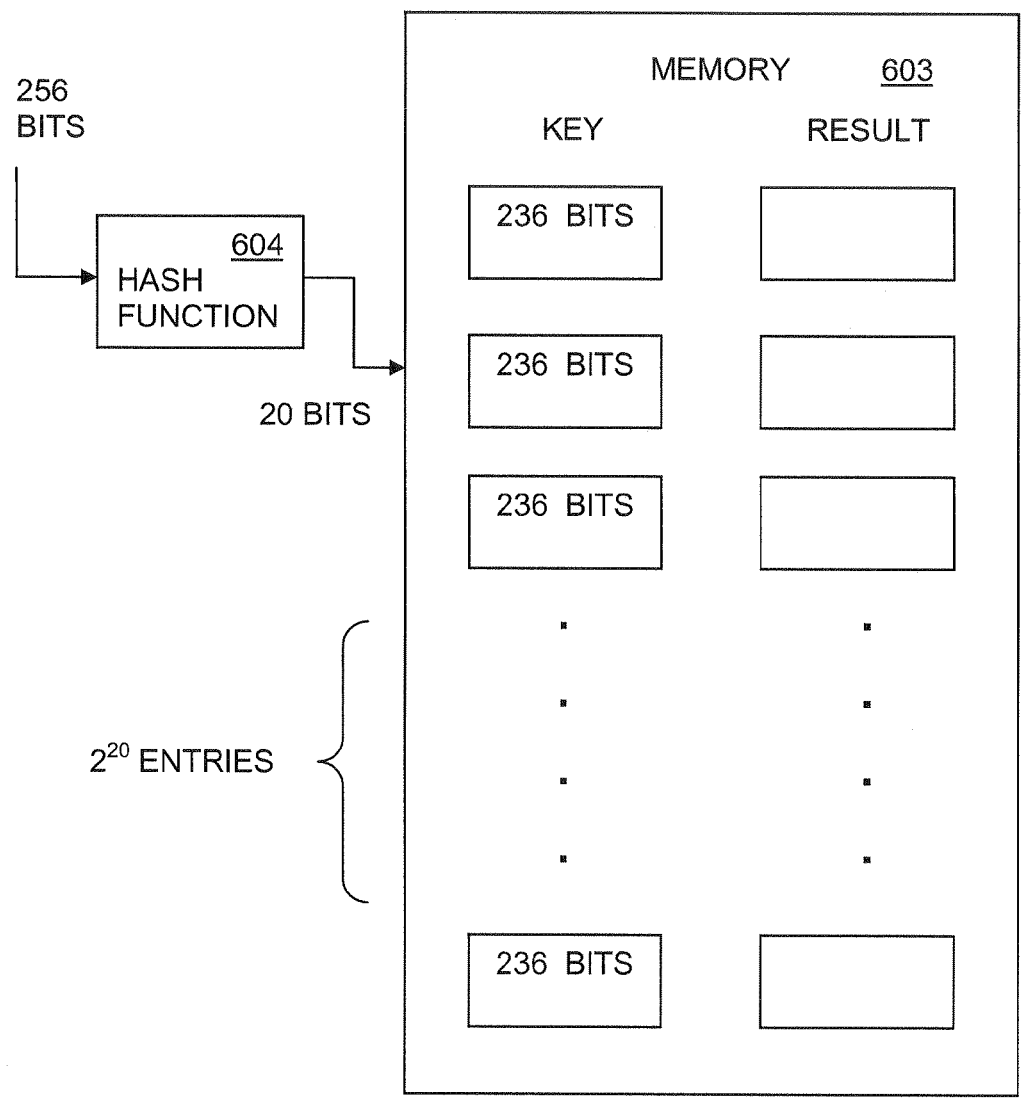
FIG. 6B shows a method for reducing the number of bits which need to be stored in memory, according to one embodiment of the present invention.

FIGS. 6A and 6B are used to highlight the memory savings according to one embodiment of the present invention. In this example, a key of 256 bits and a table size of 1M=$2^{20}$ entries are used. FIG. 6A shows a typical method used today. The 256 bit key is input to hash function 602. The transformed fixed-size 20 bit hash value is then used to access one of the $2^{20}$ entries of memory 601. Memory 601 contains a list of keys and a list of results. The keys contain the original 256 bit keys. The results contain the corresponding output ports as well as other information, such as quality-of-service (QoS).

In contrast, FIG. 6B shows a method for reducing the number of bits which need to be stored in memory, according to one embodiment of the present invention. In this particular embodiment, a 256-bit key is input to hash function 604. The fixed size 20 bit hash value is then used to access one of the $2^{20}$ entries of memory 603. But rather than storing the entire 256 bits of the original key, the present invention only stores a subset of those bits. The saving bits require consecutive string of bits, not the partial key. For example, the original key is 64 bits and the hash is 16 bits. A few combinations are given below:

1. partial key=original_key[63:16], saving bits=original_key[15:0]
2. partial key=original_key[47:0], saving bits=original_key[63:48]
3. partial key={original_key[63:50], original_key[33:0]}, saving bits=original_key[49:34]

Figure 7A:
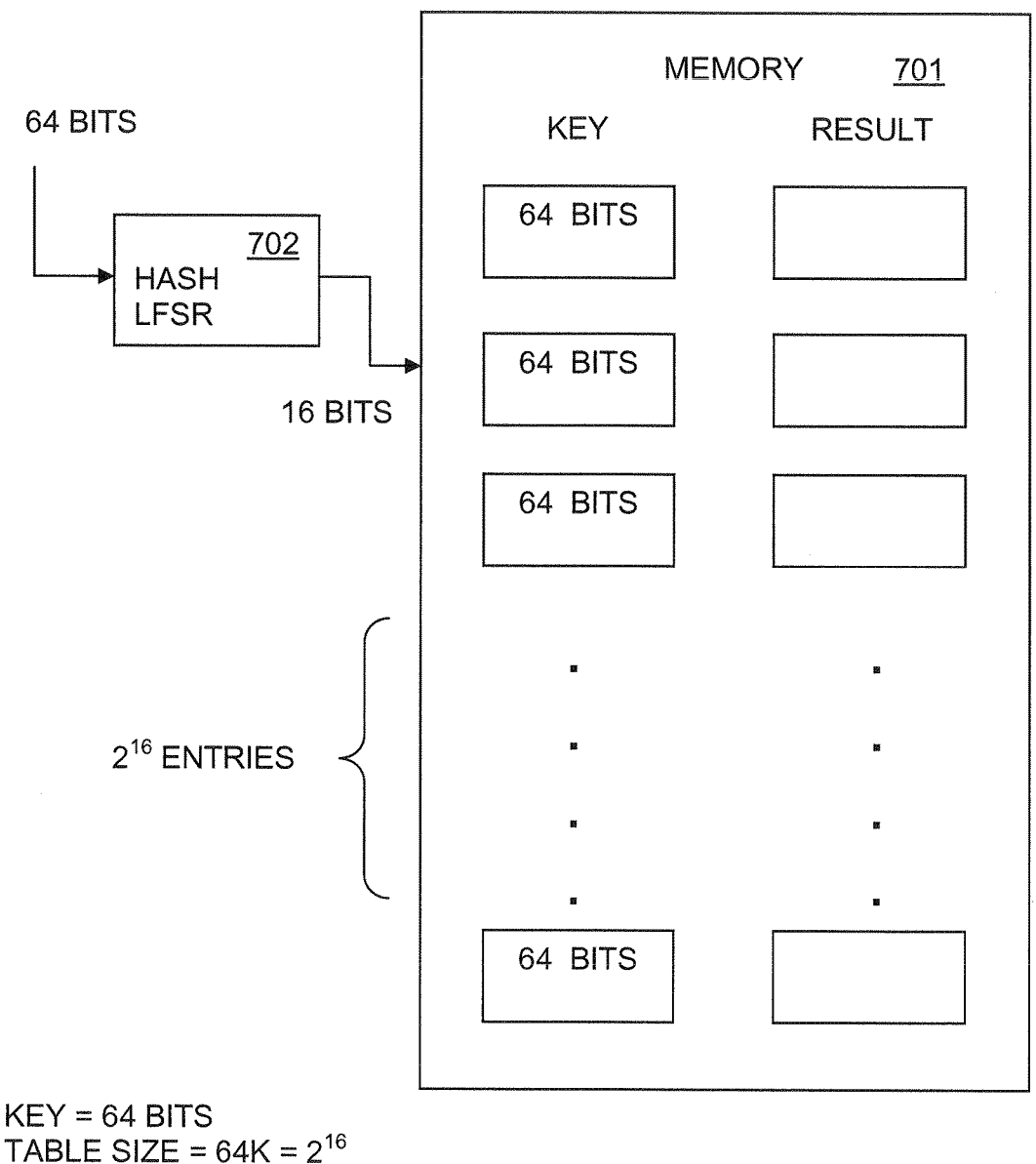
FIG. 7A shows a typical method used today.
Figure 7B:
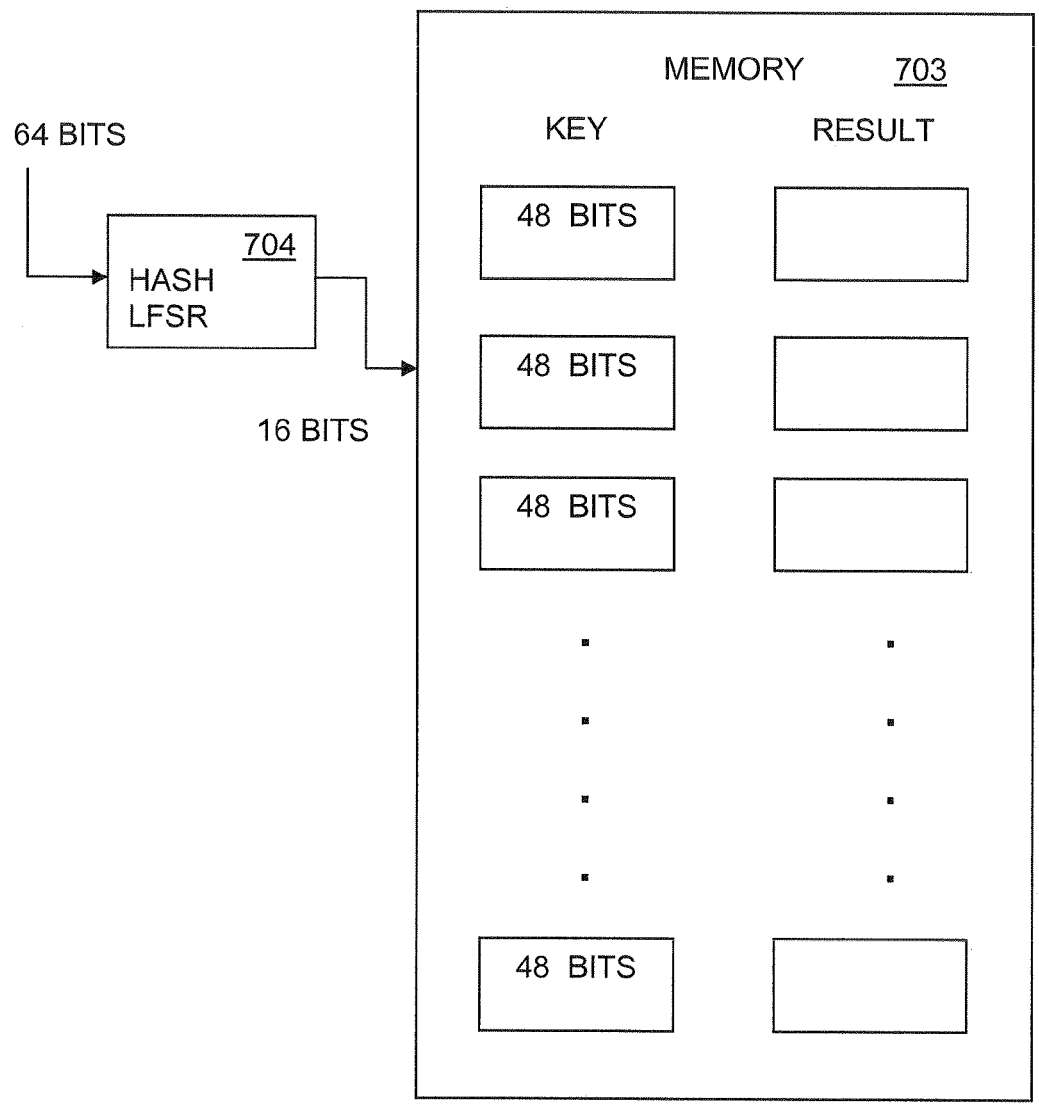
FIG. 7B shows how the same results can be obtained, but with less bits being stored in memory in accordance with one embodiment of the present invention.

In another example, FIGS. 7A and 7B illustrate the memory savings when using a key of 64 bits and a table size of 64K=$2^{16}$. FIG. 7A shows a typical method used today. The 64 bit key is input to hash function 702. In this embodiment, a linear feedback shift register (LFSR) is used. An LFSR is a popular choice for a hardware hash function due to its ease of implementation and low hash conflict. The transformed fixed-size 16 bit hash value is then used to access one of the $2^{16}$ entries of memory 701. Memory 701 contains a list of keys and a list of results. The keys contain the original 64 bit keys. The results contain the corresponding output ports as well as other information, such as quality-of-service (QoS).

In contrast, FIG. 7B shows how the same results can be obtained, but with less bits being stored in memory. As with the case depicted in FIG. 7A above, a 64-bit key is input to LFSR hash function 704. It should be noted that the present invention can apply, but is not limited to, any application that uses LFSR-based hashing, such as ones that use LFSR-based hash table or LFSR-based compressed key CAM and then points to the full key table. The fixed size 16 bit hash value is used to access one of the $2^{16}$ entries of memory 703. But rather than storing the entire 64 bits of the original key, the present invention only stores a subset of those bits. Thereby, the present invention can reduce the hash table or full key table size by only storing the partial key rather than the full key.

The present invention resolves hash conflicts in the same manner as that of the prior art method, except that less bits are compared. In the past, the full key stored in the hash table was compared against the full original key. If they matched, there was no conflict. Otherwise, a miss would indicate a conflict and the forwarding engine would retrieve the correct entry based thereon.

if (64-bit key input ==64-bit key stored in memory)
    match
    else
    miss

Figure 8:
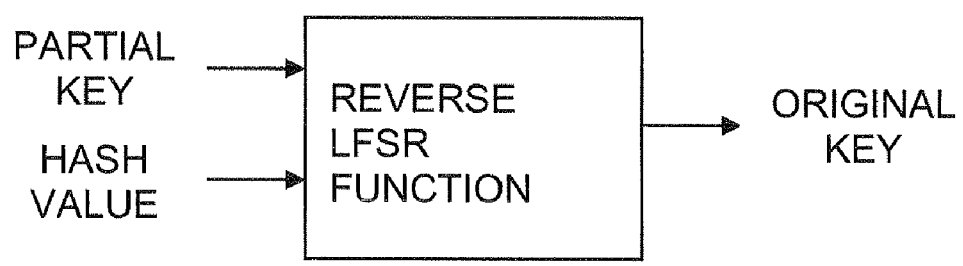
FIG. 8 shows a block diagram of a reverse LFSR function.

However, the present invention compares less bits. In the present invention, the partial key stored in the hash table is compared against the corresponding subset of bits in the original key.

if (48-bit partial key input==48-bit partial key stored in memory)
    match
    else
    miss In some applications, it may be necessary to determine the original full key. For example, central processing unit (CPU) access is needed to read out the entire entry. A mask-enabled search function is needed to search for matched keys. In one embodiment, the present invention provides a way to recover the full key so the adoption of the bit saving scheme will not prevent these types of applications from being executed. FIG. 8 shows a block diagram of a reverse LFSR function. The partial key stored in the hash table and the hash value (e.g., the address) are input to the reverse LFSR function generator 801. The reverse LFSR function generator 801 can consist of XOR gates. It can be placed between the hash table and the search engine and CPU interface so that the bit saving scheme is transparent to them. The output from the reverse LFSR function generator 801 is the original key.

The following discussion proves the validity of the present invention and provides an equation for the reverse LFSR function used to recover the full key. Given that:

KEY_SZ=size of the key.

LFSR_SZ=degree of the hash polynomial.

poly[LFSR_SZ-1:0]=LFSR polynomial equation.

initial[LFSR_SZ-1:0]=initial value of the LFSR registers.

key[KEY_SZ-1:0]=The full key used to generate the hash.

index[LFSR_SZ-1:0]=hash result.

Two kinds of LFSR implementations are discussed separately since their recovery equations are different.

(1) The 1st LFSR implementation: feedback goes to different LFSR register bits depending on the polynomial equation (Galois version).

```
index = LFSR1_Func(initial value, key, poly);
Function [LFSR_SZ-1:0] LFSR1_Func(initial value, key, poly);
{
 prev_reg = initial value;
 for ( i = KEY_SZ-1; i >= 0; i-- )
 {
  feedback = key[i] ^ prev_reg[LFSR_SZ-1];
  for ( j = LFSR_SZ-1; j > 0; j-- )
  {
   if ( poly[j] == 1) { reg[j] = feedback ^ prev_reg[j-1]; } // eqt 1
   else { reg[j] = prev_reg[j-1]; }                          // eqt 2
  }
  reg [0] = feedback;                                        // eqt 3
  prev_reg = reg;
 }
 LFSR1_Func = reg;
}
```

By reversing the calculation process, a reverse function is derived: initial value=Rev_LFSR1_Func(index, key, poly) as follows.

```
Function [LFSR_SZ-1:0] Rev_LFSR1_Func(index, key, poly);
{
 reg = index;
 for ( i = 0; i <= KEY_SZ-1; i++ ) {
  for ( j = 1; j <= LFSR_SZ-1;j++ )
  {
   if ( poly[j] == 1 ) { prev_reg[j-1] = reg[0] ^ reg[j]; } // eqt 4
   else { prev_reg[j-1[ = reg[j]; }                         // eqt 5
  }
  prev_reg[LFSR_SZ-1] = reg[0] ^ key[i];                    // eqt 6
  reg = prev_reg;
 }
 Rev_LFSR1_Func = prev_reg;
}
```

Notice that key[i] only shows up in equation 6. Both equation 5 and equation 4 are the function of next reg and reg[0] only. In other words, after the whole key shifted into the LFSR, key[KEY_SZ-1] is only found in prev_reg[LFSR_SZ-1], key[KEY_SZ-2] is only found in prev_reg[LFSR_SZ-2], . . . , key[KEY_SZ-LFSR_SZ] is only found in prev_reg[0], and the rest of the key and the index are found in all the prev_reg bits. Since it is an XOR equation, the first LFSR_SZ bits of the key (key[KEY_SZ-1:KEY_SZ-LFSR_SZ]) can swap positions with the initial value. Then the result:

$$key[KEY\_SZ\text{-}1:KEY\_SZ\text{-}LFSR\_SZ] = Rev\_LFSR1\_Func(index, \{initial\ value, key[KEY\_SZ\text{-}LFSR\_SZ\text{-}1:0]\}, poly),\quad //eqt\ 7$$

where key[KEY_SZ-LFSR_SZ-1:0] is the partial key and key[KEY_SZ-1:KEY_SZ-LFSR_SZ] is the bits that we save.

Equation 7 is the function that recovers the saved bits from the index, the initial value and the partial key. It is basically an XOR logic which can be readily implemented in hardware. Equation 7 also suggests that if two keys have the same index, the same initial value, and the same partial key, these two keys must be the same. In other words, for lookup purpose, one only needs to store and compare the partial keys. In fact, any continuous LFSR_SZ bits of the key can be saved, not just the first LFSR_SZ bits. Assume that one wants to save key[t-1:t-LFSR_SZ] for the hash function, Index=LFSR1_Func(initial value=I, key[KEY_SZ-1:0], poly)

The calculation can be broken into two steps. T is the intermediate step.

$$T = LFSR1\_Func(initial\ value=I, key[KEY\_SZ\text{-}1:t], poly)\quad //eqt\ 8$$

$$Index = LFSR1\_Func(initial\ value=T, key[t\text{-}1:0], poly),\quad //eqt\ 9$$

where t is between KEY_SZ and 0.

On equation 9, as proved above, one does not need to store key[t-1:t-LFSR_SZ]

in the hash table because it can be recovered from the index, key[t-LFSR_SZ-1:0] and the initial value T. And T can be obtained from equation 8.

(2) The 2nd LFSR implementation: feedback goes to LFSR register bit 0 but feedback consists of different LFSR register bits depending on the polynomial equation (Fibonacci version).

```
index = LFSR2_Func(initial value, key, poly);
Function [LFSR_SZ-1:0] LFSR2_Func(initial value, key, poly);
{
 prev_reg = initial value;
 for ( i = KEY_SZ-1; i>= 0; i-- )
 {
  reg[0] = key[i] ^ prev_reg[LFSR_SZ-1];           // eqt 10
  for ( j = LFSR_SZ-2; j >= 0; j-- )
  {
   if ( poly[j] == 1 )
   { reg[0] = reg[0] ^ prev_reg[j]; }
  }
  for ( j = LFSR_SZ-1; j > 0; j-- )
  { reg[j] = prev_reg[j-1]; }
  prev_reg = reg;
 }
 LFSR2_Func = reg;
}
```

Notice that key[i] is only fed into reg[0] (eqt 10). Hence, after the whole key is fed into LFSR registers, index[LFSR_SZ-1] is the function of key[LFSR_SZ-1], initial value and the partial key (key[KEY_SZ-1:LFSR_SZ]). key[LFSR_SZ-2:0] is not part of the equation. That is, index[LFSR_SZ-1]= XOR function of key[LFSR_SZ-1], initial value and the partial key. Since it is an XOR operation, index[LFSR_SZ-1] and key[LFSR_SZ-1] can be swapped.

key[$LFSR\_SZ$-1]=XOR function of index[$LFSR\_SZ$-1],initial value //eqt 11 and the partial key.

Similarly, the recovery function of key[LFSR_SZ-2] is key[LFSR_SZ-2]=XOR function of index[LFSR_SZ-2], key[LFSR_SZ-1], initial value and the partial key. Substitute key[LFSR_SZ-1] with eqt 11, key[LFSR_SZ-2]=XOR function of index[LFSR_SZ-1:LFSR_SZ-2], initial value and the partial key.

Repeat the process:
key[LFSR_SZ-3] = XOR function of index[LFSR_SZ-1:LFSR_SZ-3], initial value and the partial key.

. . .

key[0]=XOR function of index[LFSR_SZ-1:0], initial value, and the partial key.

As a result, one can recover all the saved bits, key[LFSR_SZ-1:0], from the initial value, index and the partial key, key[KEY_SZ-1:LFSR_SZ].

As implementation 1, the recovery function suggests that if two keys have the same index, the same initial value and the same partial key, these two keys must be identical. In other words, for lookup purpose, one only needs to store and compare the partial keys. In fact, any continuous LFSR_SZ bits of the key can be saved, not just the last LFSR_SZ bits. Assume that one wants to save key[t+LFSR_SZ-1:t] for the hash function:

Index=LFSR2_Func(initial value=I, key[KEY_SZ-1:0], poly)

The calculation can be broken into two steps. T is the intermediate step.

T=$LFSR2\_Func$(initial value=I,key[$KEY\_SZ$-1:$t$], poly) //eqt 12

Index=$LFSR2\_Func$(initial value=T,key[$t$-1:0],poly) //eqt 13 where t is between KEY_SZ and 0.

On equation 12, as proved above, key[t+LFSR_SZ-1:t] does not need to be stored in the hash table because it can be recovered from the index, key[KEY_SZ-1:t+LFSR_SZ] and the initial value T, where T=Rev_LFSR2_Func(initial value=Index, key[t-1:0], poly). The Rev_LFSR2_Func can be easily devised from the LFSR2_Func.

In one embodiment, the polynomial selection comprises any polynomial and is not limited to being a primitive polynomial. Furthermore, the position to save can be any N consecutive bits. The size to save can be less than or equal to the N bits. It need not be exactly N bits. In addition, the hash size can work on any N-bit polynomial (e.g., $2^N$ hash table size).

Thus, a method and apparatus for storing only a partial key as opposed to storing the entire key for purposes of hashing has been disclosed. By virtue of the fact that less bits need to be stored per entry, the present invention reduces memory requirements. The reduction in memory requirement directly translates to less costs. The improved storage efficiency conferred by the present invention does not degrade any hash functionalities whatsoever. It should be noted that the present invention is applicable to any applications, including but not limited to, the forwarding engine implementation of networking devices. For instance, the present invention is applicable to hash tables commonly used in software programming (e.g., database table for storing and extracting data).

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method comprising:
   storing a plurality of partial keys corresponding to an equal number of original keys in a hash table, wherein storage of the plurality of partial keys requires less memory than storage of the equal number of original keys, and wherein the plurality of partial keys are used to determine hashing conflicts;
   applying a hash function to an original key of said equal number of original keys to generate a partial key and a hash value, wherein the hash value includes a number of bits equal to a total number of bits of the original key minus a total number of bits of the partial key;
   accessing the hash table according to the hash value;
   reading a stored partial key of the plurality of partial keys from the hash table that corresponds to the hash value, wherein the hash value is not stored in the hash table; and
   executing a conflict check by comparing the partial key generated from the original key with the stored partial key.

2. The method of claim 1, wherein the partial key from the hash table corresponding to the hash value includes saved bits comprising a consecutive, sequential string of bits that is a subset of the original key where the subset includes a majority of bits of the original key.

3. The method of claim 2, wherein the stored partial key comprises a number of bits equal to or more than a number of bits of the original key minus a number of bits of the hash value.

4. The method of claim 1, wherein the hash value is implemented by a linear feedback shift register.

5. The method of claim 1 further comprising applying a reverse function on the stored partial key and the hash value to generate the original key.

6. The method of claim 1 further comprising the steps of:
   reading a result from the hash table corresponding to the hash value; and
   forwarding a packet of data according to the result read from the hash table.

7. An apparatus comprising:
   a hash table which stores a plurality of partial keys used to determine hashing conflicts, wherein the plurality of partial keys correspond to a plurality of original full keys;
   a hash function block coupled to the hash table that applies any polynomial to a full key and generates a partial key and a hash value which is used to point to one of the plurality of partial keys stores in the hash table, wherein the plurality of partial keys include saved bits comprising consecutive, sequentially strings of bits derived from the plurality of original full keys, and wherein the hash value includes a number of bits equal to a total number of bits of the full key minus a total number of bits of the partial key; and a processor that compares one of the plurality of partial keys to the partial key comprising a majority of bits of the full key, wherein the hash value is not saved in the hash table.

8. The apparatus of claim 7, wherein the hash table comprises a hash table size.

9. The apparatus of claim 7, wherein the one of the plurality of partial keys stored in the hash table comprises a number of bits equal to or more than a number of bits of the full key minus a number of bits of the hash value.

10. The apparatus of claim 7, wherein the hash function block comprises a linear feedback shift register.

11. The apparatus of claim 10, wherein the linear feedback shift register corresponds to a Galois version.

12. The apparatus of claim 10, wherein the linear feedback shift register corresponds to a Fibonacci version.

13. The apparatus of claim 7 further including a reverse function generator coupled to the hash table, wherein the reverse function generator restores the full key based on the one of the plurality of partial keys stored in the hash table and the hash value.

14. The apparatus of claim 7 further comprising a forwarding engine coupled to the hash table, wherein the forwarding engine forwards a data packet according to information read from the hash table at an address corresponding to the one of the plurality of partial keys stored in the hash table.

15. A method comprising:
generating a partial key and a hash value from an original key, wherein the partial key includes a consecutive subset of a majority of bits of the original key and the hash value includes a number of bits equal to a total number of bits of the original key minus a total number of bits of the partial key;
accessing a hash table including multiple partial keys, wherein the hash value is not stored in the hash table;
selecting a stored partial key from the hash table that corresponds with the hash value;
comparing the partial key with the stored partial key; and
identifying a hash conflict when the partial key matches the stored partial key.

16. The method of claim 15, wherein the multiple partial keys correspond to an equal number of multiple input keys.

17. The method of claim 16, wherein the multiple partial keys are each selectable according to a different hash value derived from one of the equal number of multiple input keys.

18. The method of claim 15, wherein the comparing of the partial key comprises reading less data than that contained in the original key.

19. The method of claim 15 including recovering the original key by combining the stored partial key with the hash value.

20. The method of claim 19, wherein the hash value corresponds to a single entry in the hash table.

21. The method of claim 19, wherein the original key is recovered by a reverse linear feedback shift register.

22. A system comprising:
a hash function that generates a hash value and a partial key from an input key, wherein the partial key includes a consecutive sequential string of bits derived from the input key and the hash value includes a number of bits equal to a total number of bits of the input key minus a total number of bits of the partial key;
a hash table including stored partial keys that correspond to an equal number of input keys, wherein the partial key includes less data bits than the input key and wherein the hash value is not stored in the hash table; and
a processor that:
identifies the partial key that is associated with the hash value;
compares the partial key to the stored partial keys; and
identifies a hash conflict when the partial key matches one of the stored partial keys.

23. The system of claim 22, wherein the stored partial keys include a majority of data bits of the corresponding input keys.

24. The system of claim 22, wherein the partial key includes multiple consecutive sequential strings of bits derived from the input key, and the multiple consecutive sequential strings of bits are separated by the bits of the hash value.

25. The system of claim 22, wherein the hash value includes an address location associated with the input key.

26. The system of claim 22, wherein the hash value includes bits from the input key that are not included in any of the stored partial keys.

27. A computer-readable medium having instructions stored thereon, wherein when the instructions are executed by at least one device, they are operable to:
generate a partial key and a hash value from an original key, wherein the partial key includes a consecutive subset of a majority of bits of the original key and the hash value includes a number of bits equal to a total number of bits of the original key minus a total number of bits of the partial key;
select a stored partial key from a hash table that corresponds with the hash value, wherein the hash value is not stored in the hash table;
compare the partial key with the stored partial key; and
identify a hash conflict when the partial key matches the stored partial key.

28. The computer-readable medium of claim 27, wherein the instructions are further operable to:
read a result from the hash table corresponding to the hash value; and
forward a packet of data according to the result read from the hash table.

29. The computer-readable medium of claim 27, wherein the stored partial key comprises a number of bits equal to or more than a number of bits of the original key minus a number of bits of the hash value.

30. The computer-readable medium of claim 27, wherein the hash table comprises a plurality of partial keys that correspond to an equal number of input keys, and wherein the plurality of partial keys are each selectable according to a different hash value derived from one of the input keys.

31. The computer-readable medium of claim 27, wherein the instructions are further operable to:
recover the original key by combining the stored partial key with the hash value.

32. The computer-readable medium of claim 27, wherein the hash value corresponds to a single entry in the hash table.

* * * * *

UNITED STATES PATENT AND TRADEMARK OFFICE
CERTIFICATE OF CORRECTION

PATENT NO. : 7,409,526 B1
APPLICATION NO. : 10/696467
DATED : August 5, 2008
INVENTOR(S) : Yu Kwong Ng Page 1 of 1

It is certified that error appears in the above-identified patent and that said Letters Patent is hereby corrected as shown below:

On column 8, line 50, CLAIM 4, after "hash" delete "value" and insert -- function --.

Signed and Sealed this
Twenty-fourth Day of April, 2012

David J. Kappos
*Director of the United States Patent and Trademark Office*